(12) United States Patent
Bauer et al.

(10) Patent No.: US 8,332,842 B2
(45) Date of Patent: *Dec. 11, 2012

(54) APPLICATION RESTORE POINTS

(75) Inventors: Elizabeth Bauer, Appleton, WI (US);
Doug Chartrand, Rochester, MN (US);
Kevin Kirkeby, Rochester, MN (US);
Sanjay A. Patel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1050 days.

This patent is subject to a terminal disclaimer.

(21) Appl. No.: 12/271,123

(22) Filed: Nov. 14, 2008

(65) Prior Publication Data

US 2010/0125841 A1    May 20, 2010

(51) Int. Cl.
*G06F 9/445* (2006.01)
*G06F 9/44* (2006.01)
(52) U.S. Cl. .......... 717/174; 717/120; 717/169
(58) Field of Classification Search .......... 717/120–122, 717/168–178; 709/203
See application file for complete search history.

(56) References Cited

U.S. PATENT DOCUMENTS

| 6,112,024 | A  | * | 8/2000  | Almond et al. ............... 717/122 |
|-----------|----|---|---------|--------------------------------------|
| 6,141,773 | A  |   | 10/2000 | St. Pierre et al.                    |
| 6,226,792 | B1 | * | 5/2001  | Goiffon et al. ............... 717/120 |
| 6,237,144 | B1 | * | 5/2001  | Delo ............................ 717/174 |
| 6,324,691 | B1 | * | 11/2001 | Gazdik ........................ 717/178 |
| 6,324,692 | B1 |   | 11/2001 | Fiske                                |
| 6,397,381 | B1 |   | 5/2002  | Delo et al.                          |
| 6,438,749 | B1 | * | 8/2002  | Chamberlain ............... 717/174   |
| 6,449,764 | B1 | * | 9/2002  | Sliger et al. .................. 717/170 |
| 6,457,175 | B1 |   | 9/2002  | Lerche                               |
| 6,631,519 | B1 | * | 10/2003 | Nicholson et al. ............ 717/169 |
| 6,684,396 | B1 |   | 1/2004  | Brittain et al.                      |
| 6,754,896 | B2 | * | 6/2004  | Mishra et al. ................. 717/176 |
| 6,757,710 | B2 | * | 6/2004  | Reed ............................ 709/203 |
| 6,836,657 | B2 |   | 12/2004 | Ji et al.                            |
| 6,934,881 | B2 |   | 8/2005  | Gold et al.                          |

(Continued)

FOREIGN PATENT DOCUMENTS

EP    1318452 A1    11/2003

(Continued)

OTHER PUBLICATIONS

Li et al, Dependability of complex software systems with component upgrading, IEEE, pp. 413-148, 2000.*

(Continued)

*Primary Examiner* — Anil Khatri
(74) *Attorney, Agent, or Firm* — Patterson & Sheridan LLP

(57) ABSTRACT

Techniques are disclosed for creating an application restore point when an application is installed or updated and for restoring the application and other elements of a computing system modified by the installation and update processes to a state as they exist at the application restore point. The application restore point captures information about which files are modified, created, or deleted by the installation and update processes. In one embodiment, a user invokes an installer process to install or update the application. When the installer process modifies or creates a file, an original copy of the file, or a reference to the file is placed into the application restore point. To restore the application, files of the computing system having original copies in the application restore point are replaced with the original copies while all new files referred to in the application restore point are deleted.

22 Claims, 4 Drawing Sheets

U.S. PATENT DOCUMENTS

| | | | |
|---|---|---|---|
| 6,978,452 B2 * | 12/2005 | Oesterreicher et al. | 717/171 |
| 6,993,760 B2 * | 1/2006 | Peev et al. | 717/174 |
| 7,085,957 B2 | 8/2006 | Sundareson et al. | |
| 7,117,495 B2 * | 10/2006 | Blaser et al. | 717/174 |
| 7,263,688 B2 * | 8/2007 | Pitzel et al. | 717/121 |
| 7,279,154 B2 * | 10/2007 | Loffler et al. | 424/70.2 |
| 7,340,738 B2 * | 3/2008 | Bragulla et al. | 717/174 |
| 7,356,816 B2 * | 4/2008 | Goodman et al. | 717/172 |
| 7,398,524 B2 * | 7/2008 | Shapiro | 717/175 |
| 7,506,338 B2 * | 3/2009 | Alpern et al. | 717/177 |
| 7,509,636 B2 * | 3/2009 | McGuire et al. | 717/168 |
| 7,577,949 B2 * | 8/2009 | Barr et al. | 717/169 |
| 7,664,982 B2 | 2/2010 | Mue et al. | |
| 7,676,804 B2 * | 3/2010 | Ferguson et al. | 717/173 |
| 7,703,090 B2 * | 4/2010 | Napier et al. | 717/168 |
| 7,735,078 B1 * | 6/2010 | Vaidya | 717/171 |
| 8,001,527 B1 * | 8/2011 | Qureshi et al. | 717/120 |
| 8,037,471 B2 * | 10/2011 | Keller et al. | 717/174 |
| 2002/0042892 A1 | 4/2002 | Gold | |
| 2002/0092010 A1 | 7/2002 | Fiske | |
| 2002/0095671 A1 | 7/2002 | Delo et al. | |
| 2004/0158817 A1 | 8/2004 | Okachi et al. | |
| 2007/0174832 A1 | 7/2007 | Brehm et al. | |
| 2008/0155302 A1 | 6/2008 | Mue et al. | |
| 2008/0263541 A1 | 10/2008 | Murata et al. | |

FOREIGN PATENT DOCUMENTS

| | | | |
|---|---|---|---|
| WO | 2005119432 A2 | 12/2005 | |

OTHER PUBLICATIONS

Stepan et al, "Controller paterns for component based reactive control software systems", ACM CBSE, pp. 71-76, 2012.*

Atkinson et al, "Iterative and incremenatl development of component based software architectures", ACM CBSE, pp. 77-82, 2012.*

Mei et al, "A software configuration management model for supporting component based software development", ACM SIGSOFT, vo. 26, No. 2, pp. 53-58, 2001.*

Office Action History of U.S. Appl. No. 12/271,147 dated Oct. 6, 2010.

* cited by examiner

APPLICATION RESTORE POINTS

BACKGROUND OF THE INVENTION

1. Field of the Invention

Embodiments of the present invention generally relate to backing-up and restoring an application in a computing system, and more particularly, to using application restore points to restore an application (or operating system component) to a state that existed prior to installing (or upgrading) the application.

2. Description of the Related Art

Installing new applications, as well as updating an existing application or operating system, is a commonly occurring process. For example, application (and operating system) vendors frequently release patches that update an application, correct a "bug" or security problem. Sometimes however, installing new applications or upgrading existing ones disrupts a computer system. That is, the upgrades sometimes "break" the application (or other applications running on the system). For example, if an upgrade process does not complete successfully, the application may not be able to function properly and/or data could be lost. Similarly, an upgraded application sometimes affects other system applications in unanticipated ways, such as preventing them from functioning properly. Thus, in some cases, the application or upgrade may have to be removed to allow the computing system to resume functioning properly.

One approach to removing an application upgrade is to create a complete image of a computing system prior to installing (or upgrading) an application, and then restore that image if necessary. However, this approach often requires significant storage resources. Furthermore, restoring an application to a state before the upgrade requires a user of the computing system to remember to create the system image before initiating an upgrade process. Moreover, this approach frequently results in substantial downtime during the back-up process, during the installation process, or, if the image is used to restore the system, during the restoration process.

SUMMARY OF THE INVENTION

Embodiments disclosed herein provide a method, computer-readable medium, and system for performing an operation to create an application restore point for an application. The operation generally includes invoking an installer process configured to apply an install package to the application. The operation also includes generating an application restore point data structure. The application restore point data structure is configured to store a new component list. The application restore point data structure is further configured to store an original copy of each of one or more components of the application to be modified when the install package is applied by the installer process. The operation also includes, when the installer process applies the install package, storing an unmodified copy of each component modified by the installer process in the application restore point data structure. The operation also includes, when the installer process applies the install package, adding a reference to each new component added to the computing system by the installer process to the application restore point data structure. The new component list is stored in the application restore point data structure.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
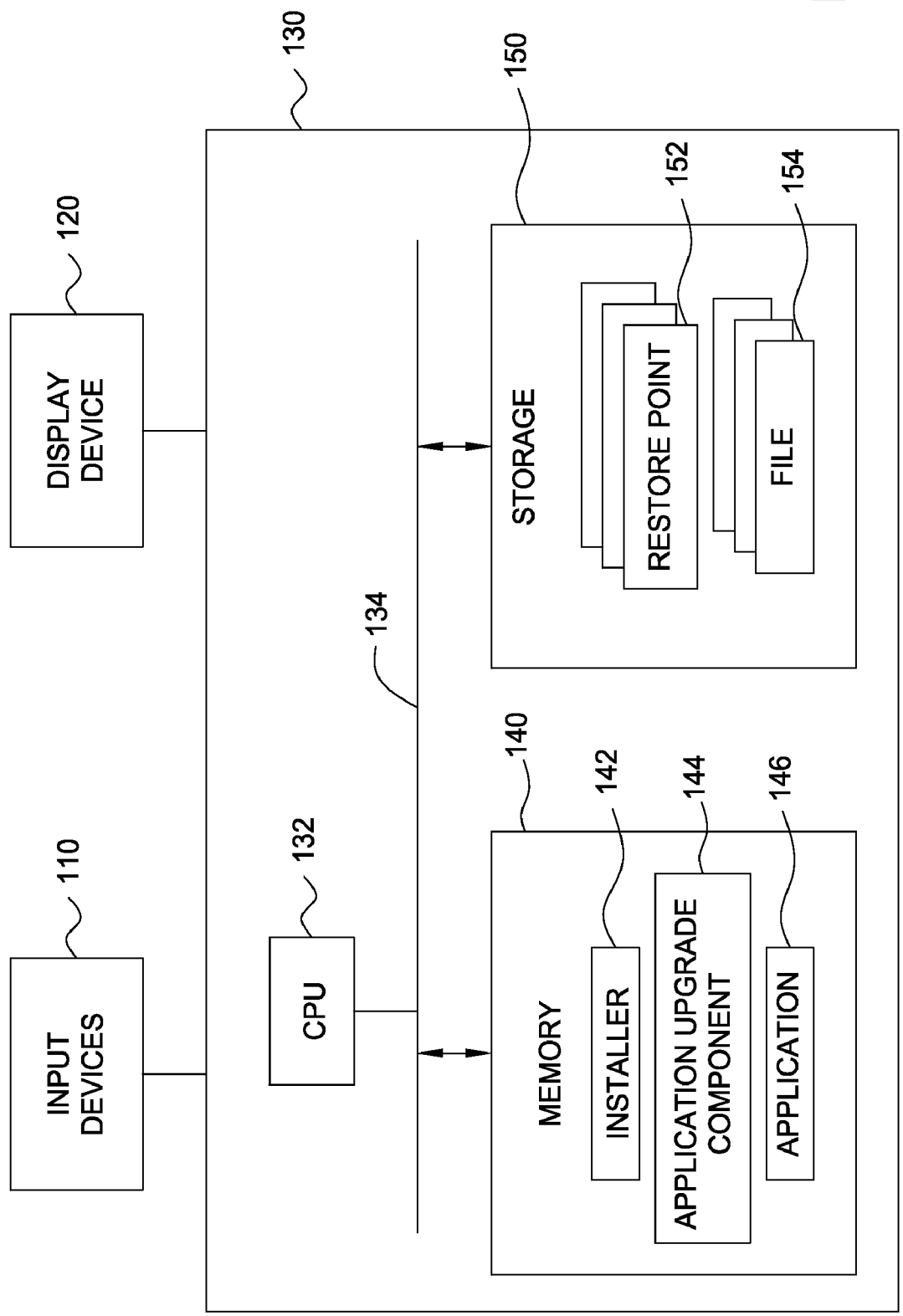
FIG. 1 is a block diagram illustrating a computing system, according to one embodiment of the invention.

Embodiments of the invention provide techniques for creating an application restore point when an application is installed, updated, or patched. When needed, an application restore point may be used to restore the application and related portions of a computing system to a state that existed at the application restore point. In one embodiment, the application restore point captures information about what components, files, or other elements of an application and/or a computing system running the application are modified, created, or deleted while installing (upgrading) the application. Importantly, the creation and restoration processes do not disrupt other applications running on the computing system. In other words, while an application restore point is created or used to restore an application (i.e., to effectively undo an installation or patch), other components and applications of the computing system may be used. Furthermore, as the creation and restoration processes primarily involve files required for the installation process, the computing system's resources are conserved and may be employed for different purposes.

In one embodiment, a user invokes an installer process to install, update, or patch an application in a computing system. The installer process creates an application restore point for the application. During the execution of the installer process, some files of the computing system may have to be modified and/or new files may have to be created. If a file is modified by the installer process, an original copy of the file (i.e., a copy of the file in a state before it has been modified by the installer process) is placed into an application restore point. If a file is created by the installer process, a reference to such a file is included in the application restore point. In this manner, when the installer process successfully or unsuccessfully completes installing, updating, or patching the application, the application restore point contains original copies of each file modified (or deleted) by the installer process and a list of files (i.e., new files) created by the installer process. Accordingly, to restore the application and corresponding portions of the computing system to a state before the installer process made any changes, files of the computing system included in the new files list are deleted, while files modified by the installer are replaced with the unmodified versions (i.e., original copies) captured during the install (or update) process.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computing system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating an example of a computing system 100, according to one embodiment of the invention. As shown, the computing system 100 includes input devices 110 such as a keyboard and mouse pointing device, a display device 120 such as a CRT or LCD display monitor, and a computer system 130. Illustratively, computer system 130 includes one or more central processing units ("CPU") 132, a memory 140, and a storage 150, coupled to one another by a bus interface 134. CPU 104 represents one or more programmable logic devices that perform all the instructions, logic, and mathematical processing in a computer. For example, CPU 104 may represent a single CPU, multiple CPUs, a single CPU having multiple processing cores, and the like. The memory 140 may be one or a combination of memory devices, including a random access memory sufficiently large to hold the necessary programming and data structures. The storage 150 may be one or a combination of storage devices which include but not limited to physical disk drives, flash memory devices, etc., as well as network attached storage devices and storage volumes mounted over a network.

The computer system 130 is included to be representative of existing computer systems, e.g., desktop computers, server computers, laptop computers, tablet computers, and the like. However, the server system 130 illustrated in FIG. 1 is merely an example of a computing system. Embodiments of the present invention may be implemented using other computing systems, regardless of whether the computer systems are complex multi-user computing systems, such as a cluster of individual computers connected by a high-speed network, single-user workstations, or network appliances lacking non-volatile storage. Further, the software applications described herein may be implemented using computer software applications executing on existing computer systems. However, the software applications described herein are not limited to any currently existing computing environment or programming language, and may be adapted to take advantage of new computing systems as they become available.

As shown, memory 140 includes an installer 142, an application upgrade component 144, and an application 146 configured to run on the computing system 100. The installer 142, application upgrade component 144, and application 146 are generally supported by an operating system (not shown) also residing in the memory 140. Examples of the operating system include IBM AIX®, UNIX®, Microsoft Windows®, and distributions of the Linux® operating system, and the like. More generally, any operating system capable of supporting the functions described herein may be used.

In general, the installer 142 may be used to install, upgrade, patch, and/or delete the application 144 in the computing system 100 using the application upgrade component 144. During such a process, one or more files 154, and restore points 152 may be created, modified, or deleted. The files 154 and restore points 152 reside in the storage 150. More specifically, the files 154 include files, components, or other elements of the application 146 and/or the computing system 100, which are modified by the installer process 142 while upgrading the application 146. Each application restore point 152 provides a data structure which the corresponding to an application upgrade installed by the installer 142. In one embodiment, at least one application restore point 152 is created while upgrading the application 146. Such an application restore point 152 may subsequently be used, if needed, to restore files, components, and/or other elements of the application 146 and/or computing system 100.

Figure 2:
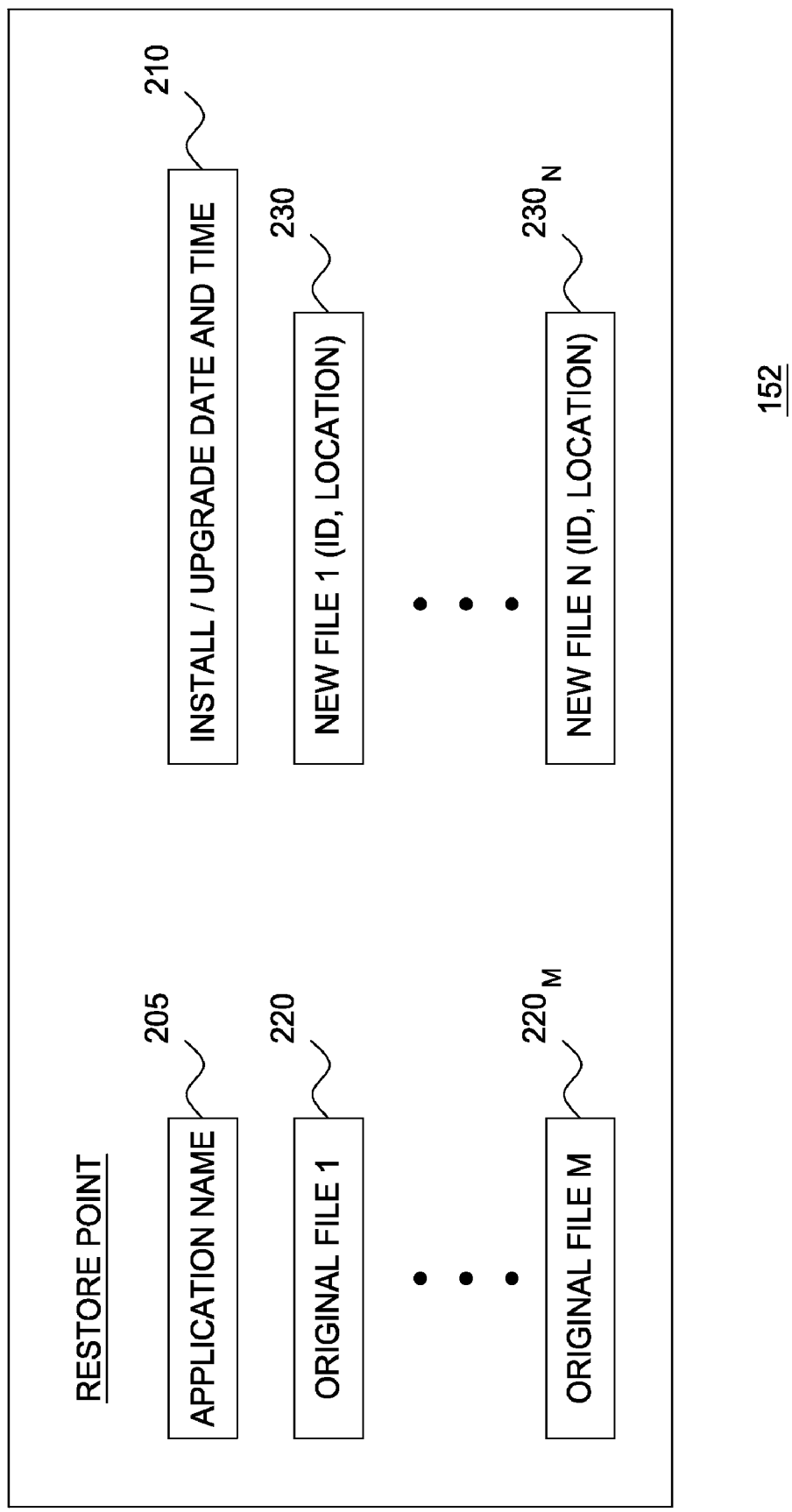
FIG. 2 illustrates an application restore point, according to one embodiment of the present invention.

FIG. 2 illustrates an exemplary application restore point 152, according to one embodiment of the present invention. In general, the application restore point 152 is a data structure storing information relevant to possible restoration of a corresponding application. As shown, the application restore point 152 includes information identifying the particular application that is associated with the application restore point, such as an application name 205; install/upgrade data and time 210 which may specify a particular process performed on the application such as the date and time when the process was performed, what type of process was performed (e.g., an installation, upgrade, patch, and the like). Application restore point 152 also includes one or more original files $220_1$-$220_M$ (collectively referred as files 220), where each original file is a copy of a file modified by the installer process captured by the application restore point prior to the installer process modifying the file as well as a list of new files created by the installer process, such as new files $230_1$-$230_N$.

As described in greater detail below, in one embodiment, a copy-on-write process may be used to capture an unmodified copy of a file prior to that file being modified by the installer 142. Further, files saved to the application restore point via the copy-on-write mechanism may be identified to be applicable to the restore point by matching a process id of the process that is modifying the file to the process id of the installer program (or a child process). In this way, other files modified by application that are also running during the install up upgrade do not get added to the restore point. The list of files may include identification information of the created files, such as a name of each newly created file and its location along with any other information required to restore the original files (or remove newly installed files) when restoring to an application restore point 152.

Figure 3:
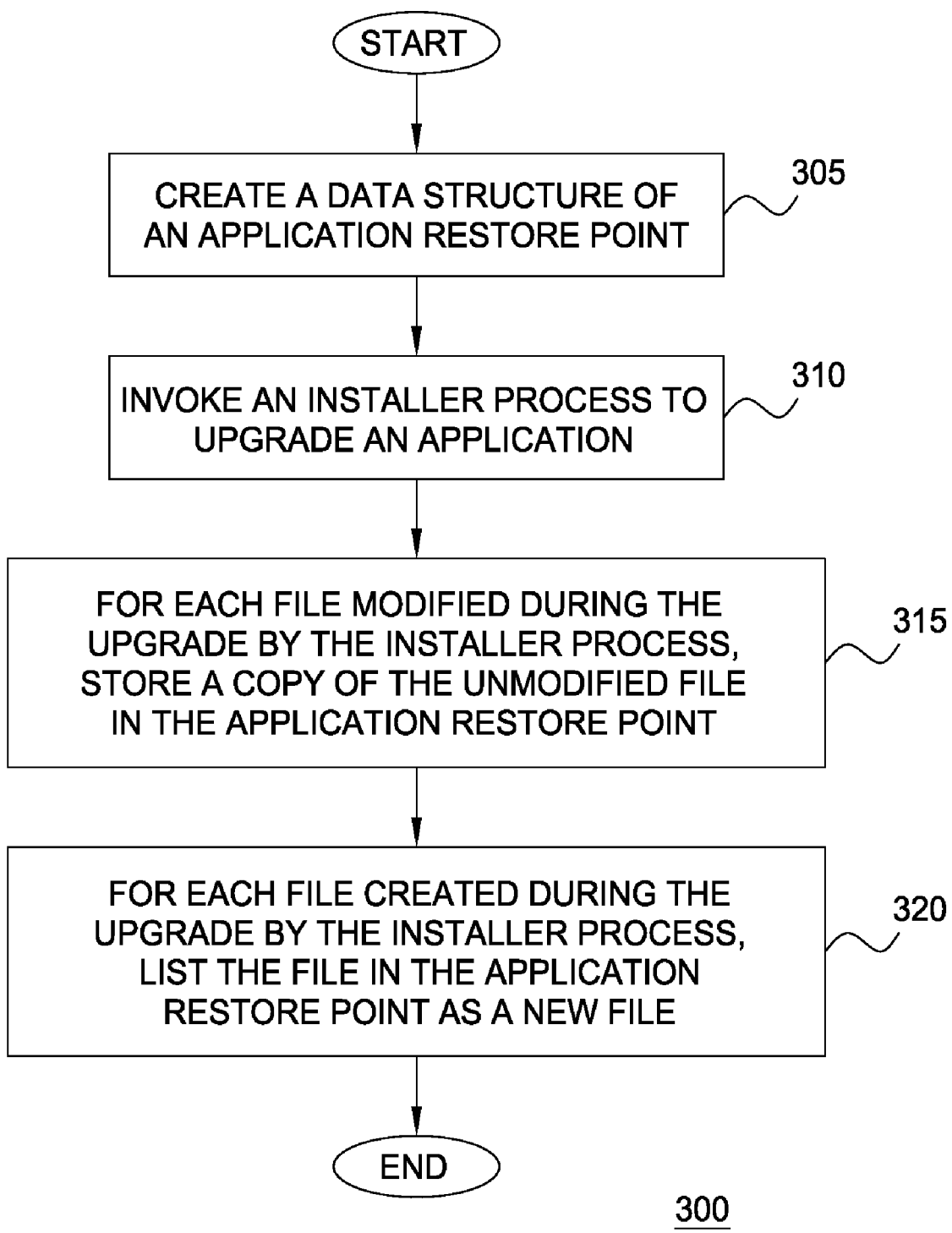
FIG. 3 illustrates a flowchart of a method for creating an application restore point, according to one embodiment of the invention.

FIG. 3 illustrates a flowchart of a method 300 for creating an application restore point, according to one embodiment of the invention. As discussed, an application restore point, such as a restore point 152, captures and stores information about changes in computing system elements including the application, i.e., files 154, caused by an installation or upgrade process. To store such information, at step 305 a data structure of an application restore point is created and/or initialized.

At step 310, an installer process, such as an installer 142 shown in FIG. 1, is invoked to upgrade (or install) an application 146, where the application 146 is adapted to run on a computing system 100. In general, the installer process 142 is configured to use an application upgrade component 144 to upgrade the application 146 and, while upgrading, to monitor changes caused by the upgrade process. When a change is identified, the installer process 142 stores information describing what changes occurred in the application restore point 152. In one embodiment, the installer process 142 is implemented as a component of a package management system (i.e., a system of tools for used to automate the process of installing, upgrading, configuring, and removing programs from a computing system). In such a case, the install process is initialized to install, upgrade, or remove components of an application (or the application itself). Further, as part of performing any such act, the installer process 1342 may create an application restore point 152 corresponding to whatever upgrade, patch, or install process is performed.

At step 315, for each file modified during the upgrade by the installer process 142, a copy of the unmodified file (i.e., original file 220) is added to the application restore point. In one embodiment, when the same file is modified multiple times during the upgrade process, only one copy of the original file is saved, e.g., at the time the file is modified for the first time. In this manner, when the installation process is complete, the application restore point includes an original copy of any file modified (or deleted) in the computing system during the installation process.

Some installation or upgrade processes may create new files in the computing system. Accordingly, to remove changes caused by the installation processes, such new files should be removed. To keep track of such files, at step 320, each file created during the upgrade by the installer process 142, is listed in the application restore point as a new file 230. Note that some of the created files may be temporary files created only for duration of the upgrade process. In one embodiment, the installer process 142 does not place such temporary files in the new files list. Alternatively, the installer process 142 does not identify temporary files, however, when a file needs to be removed the installer process checks whether the file is on the new files list. If yes, then the file is removed from the new files list and no copy of the file is created. In this manner, when the installer process 142 successfully (or unsuccessfully) completes the installation process, the application restore point 152 contains references to files created during the upgrade process by the installer process.

The installer process 142 may employ various tools to execute steps 315 and 320 and identify only files modified during a particular installation process. For example, in one embodiment, tools provided by a journaling or tracing filing system are used. In a journaling file system changes are logged in a journal before being committed. Accordingly, the installer process 142 may uses such logs to detect a file change and caused by the upgrade process before such a change is committed. For example, a "copy-on-write" process may be used. As is known, the "copy-on write" process allows an application (in fact multiple applications) to access a file. In the event the application writes (i.e., modifies) the file, the copy on write process creates a copy of the file written to by the application. In one embodiment, rather than provide the installer process with the "copy-on-write" copy, such a copy is simply added to the application restore point, and the actual copy of the file is written to by the installer process 142. In this manner, the installer process 142 saves original copies of files before they are modified or deleted as part of installing (or upgrading, patching) an application.

In another embodiment, immediately before initializing the upgrade process, the installer process 142 creates a snapshot of the computing system 100 (such as a read-only copy of the computing system files) using, for example, tools provided by the known Linux® Logical Volume Manager package. Then, when the installer process 142 detects a relevant file change, it obtains an unmodified version of the file from the snapshot. Upon completing the upgrade process, the installer process 142 may delete the snapshot.

In one embodiment, when a user invokes an installer process 142 to upgrade an application 146, the installer process 142 automatically generates an application restore point 152 and executes the above described steps 305, 315, and 320. Accordingly, the user does not have to back up data before the upgrade process. Rather, every time the user employs the installer process to upgrade an application, a respective application restore point is created, allowing the user, when needed, to restore files modified during and by the upgrade process to a state before such a process has been executed. Optionally, the installer process may be configured to create multiple application restore point during different phases of the upgrade process.

Figure 4:
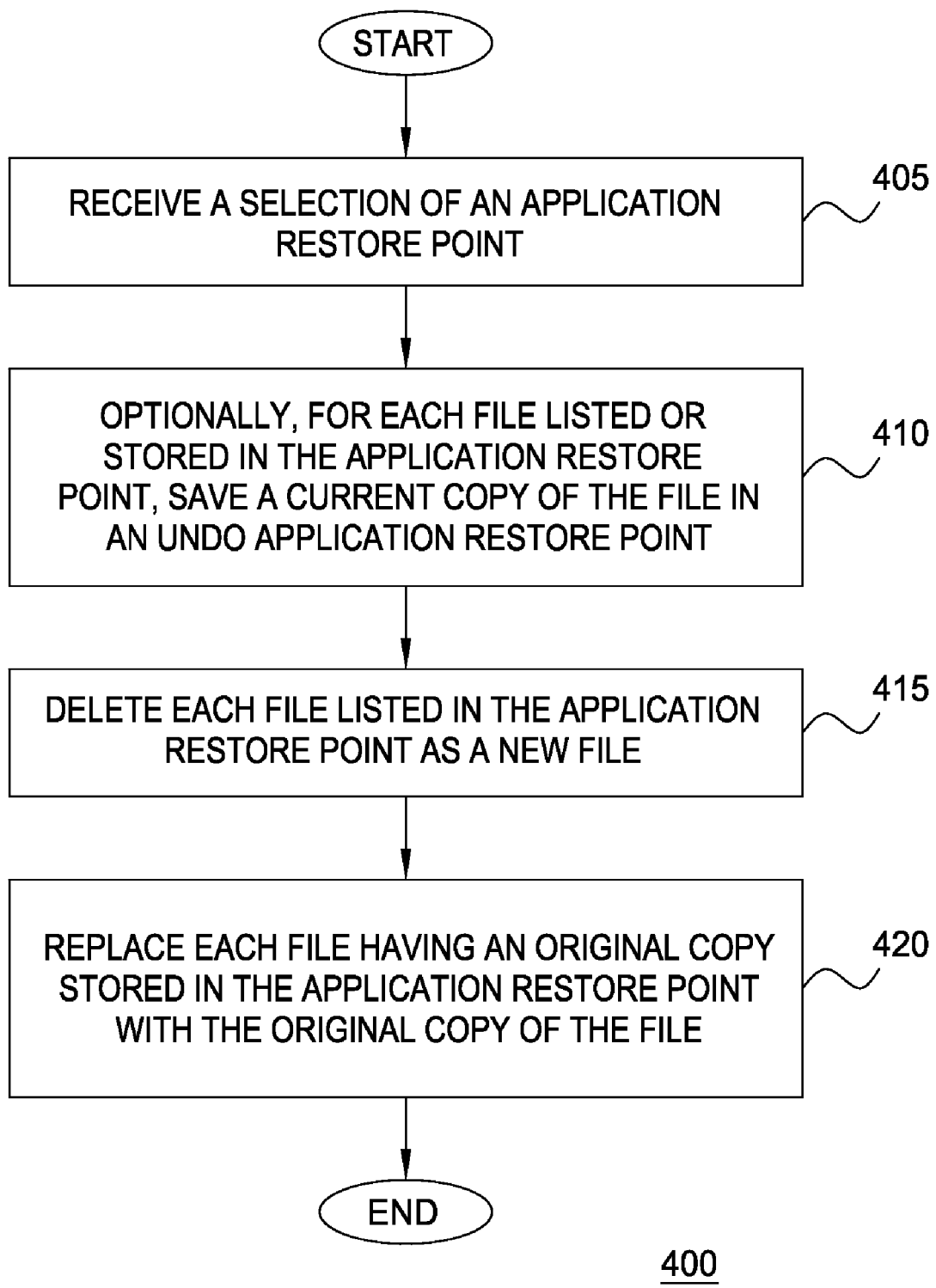
FIG. 4 illustrates a flowchart of a method for restoring an application based on an application restore point, according to one embodiment of the invention.

FIG. 4 illustrates a flowchart of a method 400 for restoring an application using a restore point, according to one embodiment of the invention. At step 405, a selection of an application restore point is received. In one embodiment, the application may be associated with multiple application restore points. As discussed, each application restore point represents a particular state of an application and relevant elements (such as files, registry keys, and so on) modified by the installation of a patch, upgrade, or the application itself. For example, an application restore point may capture a state of multiple files prior to installing an application, a state of relevant files before a certain point during the installation process, a state of relevant files before the application has been upgraded to one version, a state of relevant files before the application has been upgraded to another version, and so on. In one embodiment, the user is provided with an interface allowing the user to choose the desired application restore point.

Optionally, to provide the user with an opportunity of undoing the restoration process, references to files to be created by the restoration process and copies of files modified or deleted by the restoration process are saved and stored in an undo application restore point at step 410. In one embodiment, such files are determined using information contained in the selected application restore point. That is, the process of restoring an application restore point may itself be viewed as an upgrade, for which a corresponding application restore point may be generated. As discussed, files listed as new files in the application restore point are the files created by the installer process, and thus, need to be removed during the restoration process. As such, copies of such files are saved in the undo application restore point. If a file has a corresponding original copy stored in the application restore point, then the file has been either modified or deleted by the installer process, and thus, a current copy of the file (at a state before initializing the restoration process) is saved in the undo application restore point. When the file does not exist, a reference to the file is included in a new file list of the undo application restore point. In another embodiment, the undo application restore point is generated using a method for creating an application restore point, such as described above with respect to FIG. 3, where the installer process executes the restoration process for the application.

At step 415 of the method 400, each file listed in the application restore point as a new file may be deleted. As discussed above, if a file is listed as a new in the application restore point then such a file was initially created by the installer process when this particular application restore point was created. Accordingly, to restore the application and portions of the computing system affected by the installer process to a state captured in the selected application restore point, the new files listed in the application restore point are deleted. Note that the application restore point contains information as required to locate such a file in the computing system, e.g., a pathname and a filename.

At step 420, each file modified during the installer process is replaced with the original copy stored in the application restore point being restored. As discussed above, the application restore point contains original copies of the files modified or deleted during the installer process. Accordingly, to restore the application and portions of the computing system affected by the installer process to a state represented by the application restore point, the original copies stored in the application restore point are restored. More specifically, if a file has been deleted since it was modified by the installer process, such a file is restored, e.g., an original copy of the file stored in the application restore point is placed into the computing system. If a file of the computing system modified by the installer process still exists in the computing system, then its current version is deleted from the computing system and an original copy of the file stored in the application restore point is placed into the computing system. In one embodiment, step 420 is executed file-by-by file. Alternatively, all original copies contained in the application restore point are copied into the computing system replacing the existing files.

When steps 415 and 420 complete restoring all the files identified in the application restore point, the method 400 is completed. Optionally, upon completion of method 400, the application restore point used by the method is removed.

Advantageously, as described herein, embodiments of the invention enable creating an application restore point when an application is installed, updated, or patched and, when needed, restoring the application and relevant portions of a computing system to a state captured in the application restore point. For example, by monitoring the installation process and saving only relevant data, such as files modified by and during the installation process, the creation and restoration processes do not disrupt other applications running on the computing system. Furthermore, because the creation and restoration processes primarily involve files required for the installation process, the computing system's resources are conserved and may be employed for different purposes.

While the foregoing is directed to embodiments of the present invention, other and further embodiments of the invention may be devised without departing from the basic scope thereof, and the scope thereof is determined by the claims that follow.

What is claimed is:

1. A computer-implemented method for creating an application restore point for an application executable on a computing system, comprising:
   invoking an installer process configured to apply an install package, wherein the installer process is invoked to perform at least one of: (i) installing the application, (ii) upgrading the application, (iii) patching the application, and (iv) removing the application;
   generating, by operation of a processor, an application restore point data structure configured to store a new component list and an unmodified copy of each of one or more components of the application to be modified when the install package is applied by the installer process;
   when the install package is applied by the installer process:
   monitoring activity of the installer process in the computing system to identify components: (i) modified by the installer process, (ii) added by the installer process, and (iii) deleted by the installer process;
   for each component of the application identified as modified by the installer process, storing an unmodified copy of the component in the application restore point data structure;
   for each component of the application identified as deleted by the installer process, storing a copy of the component in the application restore point data structure; and
   for each new component identified as added to the computing system by the installer process, adding a reference to the new component to the new component list; and
   storing the new component list in the application restore point data structure.

2. The method of claim 1, wherein each component of the application modified by the installer process is identified using a copy-on-write mechanism, wherein the components are identified using a process ID (PID) associated with the installer process, wherein each component is identified subsequent to the installer process requesting a file system to alter the respective component and prior to the file system effecting the alteration responsive to the request, wherein altering the respective component comprises at least one of: (i) adding the respective component, (ii) modifying the respective component, and (iii) deleting the respective component; and wherein the activity of the installer process is monitored by a restore point generator comprising one of: (i) an application separate from the installer process, and (ii) a predefined component of the installer process.

3. The method of claim 1, wherein one or more of the modified components and the new components added to the computing system are a file stored at a specified location in a file system.

4. The method of claim 1, wherein the new component list comprises a list of filenames and a list of path locations of a respective file on the new component list in the computing system.

5. The method of claim 1, wherein at least one of the modified components or the new components added to the computing system is a registry key, a configuration file setting, and a system setting.

6. The method of claim 1, wherein the installer process is configured to access a file system mechanism to identify each component modified by the installer process and to obtain the unmodified copy of each modified component.

7. The method of claim 1, wherein the application is an operating system and wherein the install package is an upgrade or patch of the operating system.

8. The method of claim 1, further comprising:
creating a snapshot of the computing system;
obtaining, from the snapshot, each unmodified component of a component modified by applying the install package; and
upon successfully completing the install process, deleting the created snapshot.

9. The method of claim 1, further comprising:
removing at least one entries from the from the new component list corresponding to a component first installed, and subsequently removed, by the installer process as part of the applying the install package.

10. A non-transitory computer-readable storage medium containing a program which, when executed, performs an operation for creating an application restore point for an application executable on a computing system, comprising:
invoking an installer process configured to apply an install package to the application, wherein the installer process is invoked to perform at least one of: (i) installing the application, (ii) upgrading the application, (iii) patching the application, and (iv) removing the application;
generating an application restore point data structure configured to store a new component list and an unmodified copy of each of one or more components of the application to be modified when the install package is applied by the installer process;
when the install package is applied by the installer process:
monitoring activity of the installer process in the computing system to identify components: (i) modified by the installer process, (ii) added by the installer process, and (iii) deleted by the installer process;
for each component of the application identified as modified by the installer process, storing an unmodified copy of the component in the application restore point data structure;
for each component of the application identified as deleted by the installer process, storing a copy of the component in the application restore point data structure; and
for each new component identified as added to the computing system by the installer process, adding a reference to the new component to the new component list; and
storing the new component list in the application restore point data structure.

11. The computer-readable storage medium of claim 10, wherein each component of the application modified by the installer process is identified using a copy-on-write mechanism, wherein the components are identified using a process ID (PID) associated with the installer process, wherein each component is identified subsequent to the installer process requesting a file system to alter the respective component and prior to the file system effecting the alteration responsive to the request, wherein altering the respective component comprises at least one of: (i) adding the respective component, (ii) modifying the respective component, and (iii) deleting the respective component; and wherein the activity of the installer process is monitored by a restore point generator comprising one of: (i) an application separate from the installer process, and (ii) a predefined component of the installer process.

12. The computer-readable storage medium of claim 10, wherein one or more of the modified components and the new components added to the computing system are files stored at a specified location in a file system.

13. The computer-readable storage medium of claim 10, wherein the new component list comprises a list of filenames and a list of path locations of a respective file on the new component list in the computing system.

14. The computer-readable storage medium of claim 10, wherein at least one of the modified components or the new components added to the computing system is a registry key, a configuration file setting, and a system setting.

15. The computer-readable storage medium of claim 10, wherein the installer process is configured to access a file system mechanism to identify each component modified by the installer process and to obtain the unmodified copy of each modified component.

16. The computer-readable storage medium of claim 10, wherein the application is an operating system and wherein the install package is an upgrade or patch of the operating system.

17. The computer-readable medium of claim 10, wherein the operation further comprises:
creating a snapshot of the computing system;
obtaining, from the snapshot, each unmodified component of a component modified by applying the install package; and
upon successfully completing the installer process, deleting the created snapshot.

18. The computer-readable storage medium of claim 11, wherein the operation further comprises:
removing at least one entries from the from the new component list corresponding to a component first installed, and subsequently removed, by the installer process as part of the applying the install package.

19. A system, comprising:
one or more computer processors; and
a memory storing an application installer process, which, when executed by the one or more computer processors is configured to perform an operation for creating an application restore point for an application executable on the system, the operation comprising:
invoking an installer process configured to apply an install package, wherein the installer process is invoked to perform at least one of: (i) installing the application, (ii) upgrading the application, (iii) patching the application, and (iv) removing the application;
generating an application restore point data structure configured to store a new component list and an unmodified copy of each of one or more components of the application to be modified when the install package is applied by the installer process;
when the install package is applied by the installer process:
monitoring activity of the installer process in the computing system to identify components: (i) modified by the installer process, (ii) added by the installer process, and (iii) deleted by the installer process;

for each component of the application modified by the installer process, storing an unmodified copy of the component in the application restore point data structure;

for each component of the application identified as deleted by the installer process, storing a copy of the component in the application restore point data structure; and for each new component identified as added to the system by the installer process, adding a reference to the new component to the new component list; and storing the new component list in the application restore point data structure.

20. The system of claim 19, wherein each component of the application modified by the installer process is identified using a copy-on-write mechanism, wherein the components are identified using a process ID (PID) associated with the installer process, wherein each component is identified subsequent to the installer process requesting a file system to alter the respective component and prior to the file system effecting the alteration responsive to the request, wherein altering the respective component comprises at least one of: (i) adding the respective component, (ii) modifying the respective component, and (iii) deleting the respective component; and wherein the application installer process comprises one of: (i) an application separate from the installer process, and (ii) a predefined component of the installer process.

21. The system of claim 19, wherein one or more of the modified components and the new components added to the system are a file stored at a specified location in a file system.

22. The system of claim 19, wherein the new component list comprises a list of filenames and a list of path locations of a respective file on the new component list in the system.

* * * * *